United States Patent Office 3,117,933
Patented Jan. 14, 1964

3,117,933
PROCESS FOR THE PRODUCTION OF NEEDLE-SHAPED, COBALT-CONTAINING γ-FERRIC OXIDE CRYSTALLINE PARTICLES
Wilhelm Abeck, Cologne-Stammheim, and Franz Hund, Krefeld-Urdingen, Germany, assignors to Farbenfabriken Bayer Aktiengesellschaft, Leverkusen, Germany, a corporation of Germany
No Drawing. Filed June 6, 1960, Ser. No. 33,918
Claims priority, application Germany June 12, 1959
3 Claims. (Cl. 252—62.5)

The present invention is concerned with needle-shaped, cobalt-containing γ-ferric oxide crystalline particles and with a process for their production.

It is known to produce a ferro-magnetic powder for use in magnetogram carriers by initially producing a cobalt-containing iron oxide hydrate from an iron and cobalt salt solution with the aid of a basic agent and then dehydrating this hydrated oxide at temperatures of 200 to 230° C. The powder thus obtained consists of a mixture of cobalt-containing, needle-shaped γ-ferric oxide, a α-ferric oxide and iron oxide hydrate. The magnetic properties of this powder, especially its remanence and its coercivity, are unsatisfactory for many applications in magnetogram carrier technology. Furthermore, the powder has such a small particle size that its working-up is thereby frequently rendered very difficult.

The principal of object of the present invention is to provide a needle-shaped, cobalt-containing particle of γ-ferric oxide which possesses a cobalt content of preferably about 1 to about 10 atom percent, and especially of about 2 to about 4 atom percent, and a needle length of at least 0.5 micron and a needle width of at least 0.05 micron, the upper dimension limits preferably being a length of 3 microns and a width of 1.5 microns and which is free from α-ferric oxide and iron oxide hydrate. A further object of this invention is to provide a process for the production of such needle-shaped, cobalt-containing, γ-ferric oxide particles.

The needle-shaped, cobalt-containing γ-ferric oxide particle that is produced by the process of the present invention is characterized by a particularly large coercivity and remanence and, because of its particle size, is easily processed for a large variety of purposes, in particular for the production of magnetic recording tape and other magnetogram carriers.

We have found that such needle-shaped, cobalt-containing crystalline particles of γ-ferric oxide can be produced as follows: An aqueous solution of a water-soluble ferrous salt selected from the group consisting of ferrous sulfate, ferrous nitrate and ferrous chloride containing a water-soluble cobaltous salt selected from the group consisting of cobaltous sulfate, cobaltous nitrate, and cobaltous chloride is mixed at a temperature between about 0° C. and about 30° C. with an aqueous solution or suspension of a base selected from the group consisting of lithium, sodium, potassium, calcium and barium hydroxides, until the pH of the resulting mixture is between about 4.5 and about 6.5. The resulting reaction mixture is treated at this temperature with an oxidizing agent selected from the group consisting of air, oxygen, chloride and nitrobenzene, preferably oxygen or air, for the conversion of the precipitated solid particles into cobalt-containing γ-ferric oxide hydrate. The very fine particles of this γ-ferric oxide hydrate are then brought to the desired dimensions by adding to the reaction mixture further quantities of base oxidizing agent and a substance containing ferrous and cobaltous compounds selected from the group consisting of aqueous solutions of cobaltous and ferrous salts and aqueous suspensions of ferrous and cobaltous hydroxides. The cobalt-containing γ-ferric oxide hydrate so obtained is converted into cobalt-containing γ-ferric oxide by dehydration and subsequent reduction and oxidation.

The ratio of cobalt to iron in the solution of ferrous and cobaltous salts should be so adjusted that it is equivalent to double the cobalt ratio that is desired in the resulting solid product. Thus, if the cobalt content of the resulting product is to be 2 atom percent, the solution should contain 4 atom percent of cobalt and 96 atom percent of iron. A solution containing 1.68 mols of ferrous sulfate and 0.07 mol of cobaltous sulfate, for example, contains iron and cobalt in this ratio.

The pH to be used in individual cases is dependent on the oxidation temperature and should be reduced with increasing oxidation temperature within the specified range in order to prevent the formation of magnetite, which is an undesirable by-product.

To the cobalt-containing γ-ferric oxide hydrate initially formed in the first step of this process further amounts of the foregoing cobalt-containing ferrous salt solution are added together with further quantities of base while the mixture is being subjected to further treatment with one of the specified oxidizing agents at an elevated temperature, particularly a temperature between about 30° C. and about 65° C., so that the pH is maintained between about 4.5 and about 6.5, the additions of the cobalt-containing ferrous salt solution and of the base being made at such a rate that the additional quantity of precipitated product that forms is converted into cobalt-containing ferric oxide hydrate by the action of the oxidizing agent.

However, it is also possible to proceed by adding an aqueous suspension of ferrous and cobaltous hydroxides instead of the cobalt-containing ferrous salt solution to the cobalt-containing ferric oxide hydrate obtained in the first step of the process with simultaneous oxidation while maintaining a pH between about 4.5 and 6.5, the additions being made at such a rate that ferric oxide hydrate is formed by the action of the oxidizing agent. In this case, too, the pH to be used is, in individual cases, dependent on the chosen oxidation temperature in the manner described above.

Ferrous and cobaltous salts that can be used in the process of this invention, as stated hereinbefore, include all ferrous and cobaltous salts which are soluble in water, such as ferrous and cobaltous sulfates, nitrates, and chlorides. Oxidizing agents that may be used, besides oxygen or air, also include chlorine and organic oxidizing agents such as nitrobenzene.

The ferric oxide hydrate obtained in this manner is dehydrated in conventional manner, preferably at temperatures above about 200° C. The reduction step is effected in conventional manner, for example, by using hydrogen, carbon monoxide or illuminating gas. The oxidation can be carried out in the usual manner, for example, by using atmospheric oxygen.

The following examples are given for the purpose of illustrating the present invention.

*Example 1*

1.68 mols of ferrous sulfate and 0.07 mol of cobaltous sulfate (corresponding to 4 atom percent), dissolved in 5 liters of water are mixed, with stirring at 20–25° C., with 300 cubic centimeters of 10-molar sodium hydroxide solution. The resulting suspension of metal hydroxides has a pH of about 6.

A stream of air is charged at the rate of about 25 liters per minute with stirring into the hydroxide suspension. After a few hours the reaction mixture takes on an orange-brown coloration. At the end of the air oxidation the pH lies between 4.6 and 4.8.

The cobalt-containing iron oxide hydrate suspension (seed suspension) produced in this manner is diluted with 4 liters of water and heated to 50° C. While stirring and introducing air at the rate of about 30 liters per minute, 5 liters of a solution of ferrous and cobalt sulfates containing 7.2 mols of ferrous sulfate and 0.3 mol of cobaltous sulfate (corresponding to 4 atom percent) and 5 liters of a 2.79-molar sodium hydroxide solution is allowed to flow in each at the same rate during the course of 24 hours. The temperature is maintained at 50° C. during the whole of the reaction. The pH of the reaction mixture lies within the range of 4.8 to 5.3. The reaction is finished when the reaction mixture has taken on a uniform coloration (yellow-brown).

The cobalt-containing iron oxide hydrate thus produced is washed free of electrolytes with water, filtered with suction and dried at 110° C.

By dehydration at about 300° C. and reduction with hydrogen, carbon monoxide or other reducing gases at about 400° C., particles of a cobalt-containing needle-shaped magnetite ($Fe_3O_4$) are obtained which are converted into cobalt-containing needle-shaped, $\gamma$-ferric oxide particles by air oxidation at a temperature above 200° C.

The cobalt content of the resulting product is equivalent to 2.03 atom percent. The needle-shaped crystals of the product have a length of about 0.6 micron and a width of about 0.05 to about 0.06 micron. The saturation remanence $B_{R/\rho}$ amounts to 474 gausses cm.$^3$ g.$^{-1}$ and the demagnetizing field strength $H_E$ amounts to 475 oersteds.

*Example 2*

An iron oxide hydrate suspension of the kind described in Example 1 (seed suspension) is diluted with 4 liters of water and heated to 60° C. While passing in air at the rate of about 50 liters per minute and with intensive stirring, 15 liters of an iron-cobalt sulfate solution containing 21.15 mols of ferrous sulfate and 1.35 mols of cobalt sulfate (corresponding to about 4 atom percent) and 15 liters of 2.79-molar sodium hydroxide solution are added in equal amounts during the course of sixty hours. During the reaction, the pH is within the range of 5.0–5.5.

The cobalt-containing, needle-shaped $\gamma$-ferric oxide particles that are obtained by further treatment in the manner described in Example 1 contain 2.50 atom percent cobalt. The needles have a length of about 0.8 micron and a width of 0.10–0.13 micron. The saturation remanence $B_{R/\rho}$ amounts to 449 gausses cm.$^3$ g.$^{-1}$ and the demagnetizing field strength $H_E$ is 447 oersteds.

*Example 3*

1.645 mols of ferrous sulfate and 0.105 mol of cobaltous sulfate (corresponding to 6 atom percent) dissolved in 5 liters of water are admixed at 20–25° C., with stirring, with 300 cubic centimeters of 10-molar sodium hydroxide solution and oxidized with air under the conditions described in Example 1.

After dilution with 4 liters of water, the seed suspension is heated to 50° C. and, while passing in air at the rate of 25 liters per minute, 5 liters of iron-cobalt sulfate solution with a content of 7.05 mols of ferrous sulfate and 0.45 mol of cobaltous sulfate (corresponding to 6 atom percent) and 5 liters of 2.79-molar sodium hydroxide solution are charged together at equal rates into the seed solution during the course of 24 hours. The pH during the reaction lies between 4.7 and 5.3.

The iron-oxide hydrate precipitate is further treated to give cobalt-containing $\gamma$-ferric oxide in the manner described in Example 1 to give a product having a cobalt content of 3.45 atom percent, a particle length of 0.7 micron and a width of 0.07 micron. The saturation remanence $B_{R/\rho}$ amounts to 504 gausses cm.$^3$ g.$^{-1}$ and the demagnetizing field strength $H_E$ is 500 oersteds.

*Example 4*

1.69 mols of ferrous chloride and 0.070 mol of cobaltous chloride (corresponding to 4 atom percent cobalt) are dissolved in 5 liters of water and mixed at 20° C. with a solution of 128.4 grams of sodium hydroxide in 300 milliliters of water. The suspension, which has a pH of 5.5, is oxidized at 20° C. with stirring (230 r.p.m.) with air charged at the rate of 3 m.$^3$ per hour for five hours. The pH at the end of the oxidation is up to about 4.8.

2.4 liters of the seed suspension produced in this manner are diluted with 2 liters of water and heated to 50° C. Air is then introduced with stirring. During the course of 24 hours, a suspension obtained by addition, to a solution consisting of 3.85 mols of ferrous chloride and 0.16 mol of cobaltous chloride (corresponding to 4 atom percent cobalt) in 1.5 liters of water, a solution of 314 grams of sodium hydroxide in 700 milliliters of water is added portionwise to the seed solution with stirring at the rate of 140 r.p.m. During this process the reaction mixture has a pH of about 5. A greenish-yellow precipitate is obtained which is washed and dried and the dehydrated product reduced and reoxidized in the manner and under the conditions described in Example 1.

The needle-shaped $\gamma$-ferric oxide particles thus obtained have a cobalt content of 2.73 atom percent. The needles have an average length of about 0.6 micron and an average width of 0.06 micron. The saturation remanence $B_{R/\rho}$ amounts to 412 gausses cm.$^3$ g.$^{-1}$ and the demagnetizing field strength $H_E$ is 370 oersteds.

We claim:

1. A process for the production of ferromagnetic, needle-shaped, cobalt-containing gamma-ferric oxide particles having a length between about 0.5 and about 3 microns and a width between about 0.05 and about 1.5 microns which comprises
    (a) admixing, at a temperature between about 0 and about 30° C.,
        (i) an aqueous medium containing a base of the group consisting of lithium, sodium, potassium, calcium, and barium hydroxides, with
        (ii) an aqueous solution containing a water-soluble ferrous salt of the group consisting of ferrous sulfate, ferrous nitrate, and ferrous chloride, and a water-soluble cobaltous salt of the group consisting of cobaltous sulfate, cobaltous nitrate, and cobaltous chloride, the atomic ratio of the cobalt to the iron in the said solution being between about 1 and about 10 parts of cobalt to 100 parts of iron, until a pH between about 4.5 and about 6.5 is attained,
    (b) treating and rapidly stirring the resulting mixture at the said temperature with air at a rate between about 5 and about 10 volumes per volume of mixture per minute to convert the ferrous oxide hydrate to ferric oxide hydrate,
    (c) thereafter, in a second step of the process, in order to bring the cobalt-containing ferric oxide particles to the requisite dimensions, adding to the resulting reaction mixture further quantities of the said aqueous basic medium (i) and the said aqueous solution containing ferrous and cobaltous salts (ii) while maintaining the pH between about 4.5 and about 6.5,
    (d) treating and rapidly stirring the resulting mixture with such a further quantity of air that the additional quantity of the precipitated product formed in step (c) is converted into cobalt-containing ferric oxide hydrate,
    (e) subsequently separating and dehydrating the thus obtained needle-shaped, cobalt-containing ferric oxide hydrate particles having the requisite dimensions, and
    (f) reducing and reoxdizing the particles of mixed oxides thus obtained to convert them into particles of ferromagnetic, needle - shaped, cobalt - containing gamma-ferric oxide having the requisite dimensions.

2. A process as defined in claim 1 in which, in the second step of the process, the cobalt-containing ferrous salt solution, the aqueous basic medium (i), and oxidizing agent are added at a temperature between about 30 and about 65° C. while maintaining the pH within the range of 4.5 to 6.5, the addition of the salt solution and of the aqueous basic medium being made at the same rate as the precipitate is converted into cobalt-containing ferric oxide hydrate by the action of the oxidizing agent.

3. A process as defined in claim 1 in which, in the second step of the process, an aqueous suspension of ferrous and cobaltous hydroxides in which the atomic ratio of cobalt to iron is between about 1 and about 10 parts of cobalt to 100 parts of iron is added to the cobalt-containing ferric oxide hydrate with simultaneous oxidation while maintaining the pH between 4.5 and 6.5, the addition being made at the same rate as γ-ferric oxide hydrate is formed by the action of the oxidizing agent.

References Cited in the file of this patent

UNITED STATES PATENTS

| | | |
|---|---|---|
| 2,560,971 | Martin | July 17, 1951 |
| 2,694,656 | Camras | Nov. 16, 1954 |
| 2,978,414 | Harz et al. | Apr. 4, 1961 |

FOREIGN PATENTS

| | | |
|---|---|---|
| 717,269 | Great Britain | Oct. 27, 1954 |
| 721,630 | Great Britain | Jan. 12, 1955 |
| 765,464 | Great Britain | Jan. 9, 1957 |
| 557,773 | Belgium | June 15, 1957 |
| 968,424 | Germany | Mar. 13, 1958 |